Sept. 6, 1966   J. E. RICE   3,270,984
GRAVITY GRADIENT SATELLITE DAMPING DEVICE
Filed Dec. 13, 1963   2 Sheets-Sheet 1

INVENTOR.
JAMES E. RICE
BY
ATTORNEY

Sept. 6, 1966            J. E. RICE            3,270,984

GRAVITY GRADIENT SATELLITE DAMPING DEVICE

Filed Dec. 13, 1963            2 Sheets-Sheet 2

INVENTOR.
JAMES E. RICE
BY
*A.W. Oldham*
ATTORNEY

United States Patent Office  3,270,984
Patented Sept. 6, 1966

3,270,984
GRAVITY GRADIENT SATELLITE
DAMPING DEVICE
James E. Rice, Cuyahoga Falls, Ohio, assignor to Goodyear Aerospace Corporation, Akron, Ohio, a corporation of Delaware
Filed Dec. 13, 1963, Ser. No. 330,402
5 Claims. (Cl. 244—1)

This invention relates to a damping device for a gravity gradient satellite, and more particularly, to the utilization of a spring actuated fluid damping system or hysteretically damped system attached to a gravity gradient satellite in orbit to substantially eliminate oscillation of the satellite.

Heretofore it has been known that earth circling satellites tend to tumble in their orbital paths when no damping apparatus is utilized. Various means have been utilized to eliminate the tumbling such as hydrogen peroxide jets, or inertial gyroscopic stabilization. However, these methods require energy expenditures by the satellite, which energy must either be carried aboard the satellite, or picked up by some outside source during orbital flight.

Further, gravity gradient satellites have been proposed to eliminate tumbling without expenditure of any energy carried by the satellite. However, oscillation of a gravity gradient satellite is still excessive as it hunts for a point of stabilization. These gravity gradient satellites have been utilized for weather observation, solar observation, or electronic reflectors where it is requisite that the satellite be properly oriented with respect to the area observed in order to function properly. Gravity gradient satellites have substantially eliminated tumbling and have reduced oscillations to about 20°. But, 20° oscillations are excessive for certain requirements. A damping system for a gravity gradient satellite is needed.

It is the general object of the present invention to provide a damping apparatus for a gravity gradient satellite which will substantially eliminate oscillations of the orbiting satellite and maintain the satellite in a desired orientation without utilizing any internal or external energy sources.

A further object of the invention is to provide a damping device for a gravity gradient satellite which utilizes a helical spring and an associated mass to create energy losses by relative displacement of surfaces separated by a viscous fluid, and which energy losses damp out any oscillations by the satellite.

Another object of the invention is to provide a damping device for a gravity gradient satellite which utilizes a helical spring in association with a mass to effect hysteretic losses with the earth's magnetic field.

A further object of the invention is to provide a damping device for a gravity gradient satellite which is extremely simple, inexpensive, and yet highly effective in operation.

The aforesaid objects of the invention and other objects which will become apparent as the description proceeds are achieved by providing in a damping system for a gravity gradient satellite the combination of satellite means, mass means, helically wound spring means operatively connected at one end to the satellite means and at the other end to the mass means on the longitudinal axis thereof, the mass means having its mass and inertia so related to the mass of the satellite means that the extensional natural frequency of the spring means caused by the oscillation of the satellite produces a maximum cross-coupling of rotation to extension ratio, and fluid means operatively carried by the mass means which displaces upon rotation of the mass means to effect viscosity friction losses.

For a better understanding of the invention, reference should be had to the accompanying drawings, wherein.

Figure 1:
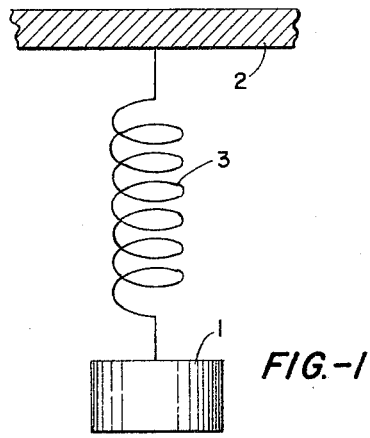
FIGURE 1 is an experimental illustration of the principle of a helical spring mass system.

While the objects of the invention may be achieved by utilizing various spring damping systems to create energy losses, the invention is usually employed in conjunction with the helical spring mass system to effect pre-determined energy losses, and hence the invention has been so illustrated and will be so described.

The vibratory system to be utilized consists of a helical spring which when extended to its pseudo-static position has a helix angle of preferably at least 30 degrees. The pseudo-static position is defined as the static deflection position under the action of the difference in the centrifugal force and the attractive force between the two bodies wherein the attractive force equals $$\frac{Gm_1m_2}{r^2}$$

At the center of gravity of the satellite the difference is zero but it has a finite value at locations away from the center of gravity. This difference of forces will extend the spring, until the restoring force of the spring brings about equilibrium. One end of the spring may be attached to a boom, or tripod or directly to the satellite. A weight is attached to the other end of the spring. The weight has a mass and mass moment of inertia about its longitudinal axis that gives the spring-mass system two natural frequencies, namely, one in plunge and one in rotation. The spring is designed to provide a maximum cross-coupling of rotation-to-plunge so that essentially maximum rotation about the longitudinal axis of the mass is always present as the spring plunges.

The mass comprises a lightweight outer shell to which the spring is attached, and a solid inner member which has a large mass-moment of inertia compared with the outer shell. A thin layer of fluid separates the outer shell from the inner member.

In operation, the satellite, swings like a compound pendulum under the action of solar forces and transient oscillations due to deployment. However, the compound pendulum movement of the satellite is of an essentially constant frequency as determined by the gravity gradient aspects thereof. Therefore, the end of the spring attached to the satellite is moved in a generally harmonic motion at a frequency generally governed by the amplitude of swing, but also determined by other factors such as the axis of oscillation, the relationship of the attachment of the spring to the satellite and other movements in the compound pendulum action. Nevertheless, the plunging action of the spring creates a rotational motion to the lightweight outer shell. Since the inner member tends to rotate slower than the outer shell due to its greater inertia, a relative slip exists between the two components. Thus, since there is a thin layer of viscous fluid separating the components, heat is generated and energy is removed from the system effecting the damping action on the satellite.

The spring-mass system described hereinafter is contemplated to have natural frequencies such that the damper mass will be rotated at a plurality of plunging frequencies of the satellite. In fact, any swinging of the satellite will effect rotation to the damping mass, but a maximum rotation is desired.

For a better understanding of the invention, reference should be had to the accompanying drawings, and particularly to FIGURE 1, wherein the principle of a helical spring-mass system is illustrated as comprising a mass 1 mounted to a support frame 2 by means of a helically coiled spring 3. The relationship between the mass 1 and mass moment of inertia of mass 1 and the spring 3 provide two degrees of freedom if it is assumed that the mass 1 is guided to remain in purely vertical motion. The two degrees of freedom are the vertical motion of the mass 1 and rotational motion of the mass 1. This "coupling" exists due to the fact that the helically coiled spring 3, when pulled out, causes a slight torque and when twisted, gives a slight pull. It is the rotary motion that results from extension that is the essential feature of the spring used for the damper.

Figure 2:
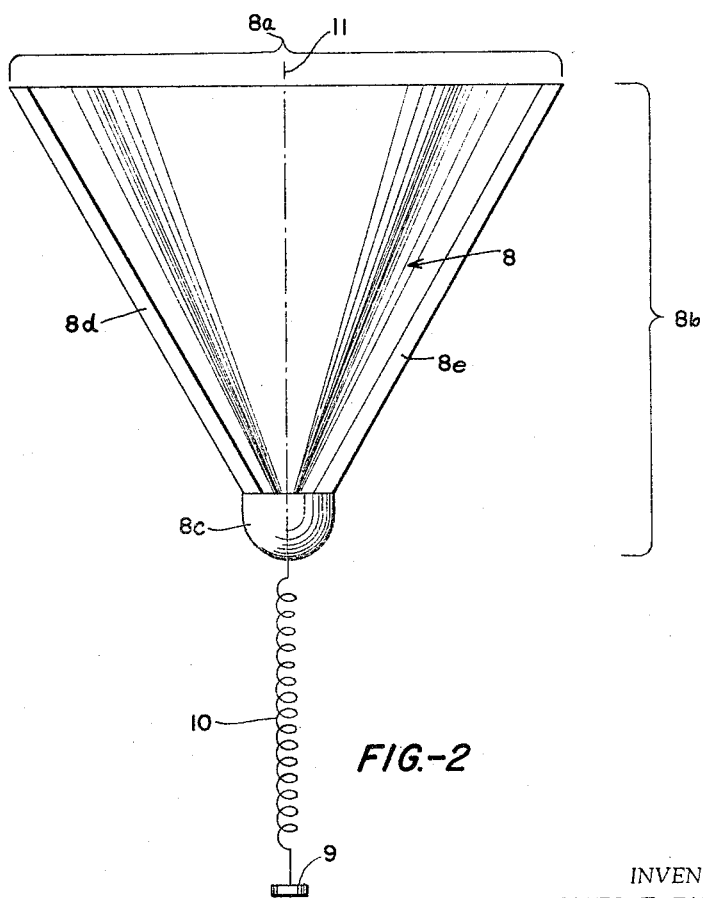
FIGURE 2 is an elevational view of a satellite employing a mass connected by a helical spring thereto, with the mass system carrying one embodiment of the fluid viscosity friction damping means of the invention.

FIGURE 2 illustrates a conically shaped gravity gradient satellite 8 having a mass 9 connected thereto by means of a helically would coil spring 10. A representative size of the gravity gradient satellite 8 is about 287 ft. across the large end of the cone, as at 8a, and about 300 ft. as at 8b, along the longitudinal axis 11. The satellite 8 is packaged in a small bundle about an apex nose 8c, and folds out to the enlarged configuration illustrated in space by means of diametrically opposed poles 8d and 8e, respectively, which poles provide the gravity gradient effect to the satellite 8 in the known manner. A representative satellite may have a mass moment of inertia of about 750,000 slug-ft.$^2$. The invention contemplates that the wire of the spring 10 be of some convenient type of spring wire, such as beryllium copper, having a diameter between about .005 inch and about .250 inch; that the spring have an extended length of between about 20 feet and about 300 feet with a coil diameter of between about 6 inches and about 48 inches. The weight of the mass 9 will be between about 3 pounds and about 150 pounds with a diameter of between about 1 foot and about 10 feet.

It is necessary that the spring 10 connect to the mass 9 substantially on the axis thereof to insure proper balancing during rotation. However, since it is only necessary to extend the spring by the oscillations of the satellite 8, the spring 10 may be attached to any external surface of the satellite 8 with the most convenient spot being the apex cone 8c, as this is usually the only portion of the satellite exposed during packaging.

The properties of the spring 10 and the mass and mass moment of inertia of the damper 9 are related to the mass and known orbital oscillatory frequency of the satellite 8 so that the extensional natural frequency of the spring 10 caused by the oscillations of the satellite 8 will produce a maximum cross-coupling of rotation to extension ratio.

With regard to the gravity gradient satellite 8, it has been determined that a spring wire diameter of about 0.0272 inch, a static spring length of about 200 feet adapted to extend about 50 feet to either side of the static position during operation with a spring coil diameter of about 18 inches, and a mass having a weight of about 100 pounds and a diameter of about 3 feet will achieve the desired damping. This makes the plunging natural frequency of the damper equal to $\sqrt{8}$ times the orbital frequency of the satellite, and the rotational natural frequency equal to 2 times the orbital frequency which will produce a maximum rotation to extension ratio of the damping mass.

In order to utilize the rotational aspects achieved by the helical spring mass principle, the mass 9 is made in the shape of a torus which incorporates fluid damping to achieve the energy loss damping features of the invention. The torus shaped mass 9 should be mounted with its axis coincident with the axis of the spring 10 in order to have proper balancing to achieve the desired rotational inertia characteristics.

Figure 3:
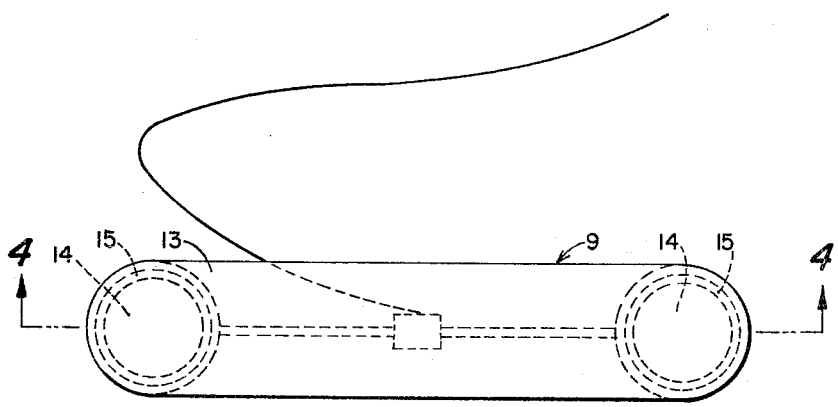
FIGURE 3 is an enlarged elevational view of the fluid viscosity friction damping means of FIGURE 2.
Figure 4:
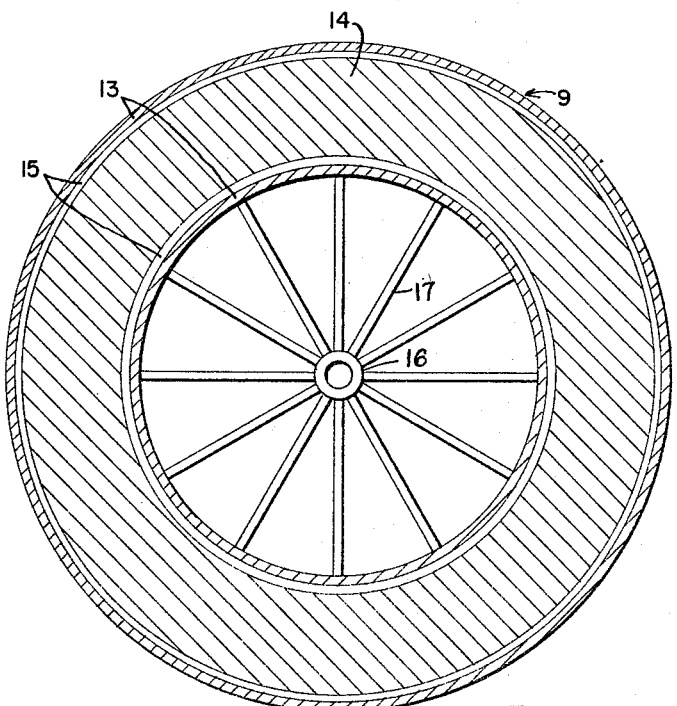
FIGURE 4 is an enlarged cross sectional view of the fluid viscosity friction damping means of FIGURE 3.

For a better understanding of the fluid damping features of the torus shaped mass 9 reference should be had to FIGURES 3 and 4. The elements comprising the mass 9 include a tin, metallic outer housing 13 having a continuous solid metallic inner ring 14 operatively positioned therein. The inner ring 14 is floatingly positioned in the outer housing 13 by means of a fluid layer 15, which is preferably of some type of viscous oil. The fluid layer 15 will floatably position the inner ring 14 within the outer housing 13 because of the weightlessness in space so that ordinary capillary attraction of the fluid to the ring 14 and housing 13 will insure the floating relationship therebetween.

The choice of oil or fluid for the fluid layer 15 is very important as the fluid chosen must maintain its viscosity over the temperature ranges encountered throughout the orbital path of the satellite. A Newtonian oil which maintains the proper viscosity without stiction will meet the requirements desired. Some silicon based oil meet the requirements desired, and it is believed that mercury might be effective. In any event a wide range of viscosities are available for the fluid layer 15 depending upon the particular construction which defines the layer thickness, the radius of rotation, and the surface area covered by the fluid layer 15. A representative damping coefficient is $5 \times 10^{-4}$ lb.-ft.-sec./Rad.

The inner ring 14 is free to rotate or move inside the outer housing 13 thereby creating a viscous friction between the relative moving surfaces of the outer housing 13 and inner ring 14 on the fluid layer 15. By utilizing the rotational action of the helical spring, the outer housing 13 of the torus shaped mass 9 will be rotated while the inner ring 14 will tend to remain stationary. Thus, the viscous fluid layer 15 will come under shear forces and the viscosity friction effects will generate heat and cause energy loss to the swinging satellite in the same manner that air friction causes loss in the earth's environment. The amount of heat generated and energy lost is dependent on the thickness of the fluid layer 15, the surface area between the moving parts and the viscosity of the fluid layer, with greater heat and higher energy loss resultant as the thickness of the fluid layer is decreased, and the surface area is increased.

The energy loss will dampen the oscillations of the satellite causing effective stabilization of the satellite in its orbital path thereby achieving the objects of the invention. No external power is necessary to initiate the action, and if some external force should tend to create oscillations to the orbiting satellite, the helical spring damping system will immediately come into action to dampen the oscillations and stabilize the satellite in its orbital path. While primary damping is effected by utilizing the rotation of the outer housing 13 relative to the inner ring 14, it should also be recognized that the inner ring 14 will move back and forth within the outer housing 13 when the spring 10 extends or compresses which further effects viscous friction energy losses within the fluid layer 15. Other embodiments of the invention contemplate more complete utilization of the reciprocating motion imparted by the spring 10.

In order to facilitate a means of attaching the spring 10 to the longitudinal axis of the mass 9, a central ring 16 mounted by a plurality of spokes 17 to the radially inner side of the outer housing 13 is provided.

Thus, it is seen that the objects of the invention have been achieved by utilizing the well known phenomenon of a helical spring as determined by the oscillation frequency of a gravity gradient satellite to bring about an interchange between extensional motion and rotary motion of a mass attached to the end of a helically coiled spring. By adding to the mass a tube in the form of a torus filled with a fluid that has viscosity, this device can be used as a damper to oscillatory motions of the satellite.

The fluid will displace in the tube due to the rotary motion of the tube as determined by the helical spring action and the viscosity friction effects will generate heat and cause energy loss to the swinging satellite. Thus, it is seen that the unique concept that provides the damping is achieved by mounting the torus shaped fluid damper in such a manner that it employs the rotary motion of the helical spring to cause fluid motion to obtain viscous friction.

Figure 5:
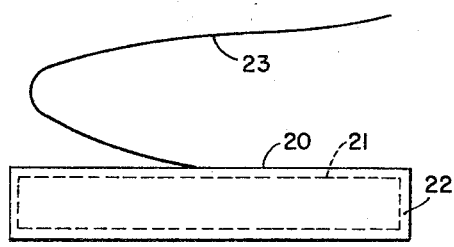
FIGURE 5 is an enlarged view of another embodiment of a fluid viscosity damping means.

FIGURE 5 illustrates another embodiment of a fluid damper utilizing a thin cylindrically shaped outer shell 20 which is substantially flat on top and bottom. A solid inner member 21, conforming to the shape of the outer shell 20, is floating positioned therein by a surrounding fluid layer 22. The layer 22 has substantially the same viscous properties described above. Again, the rotation of the outer shell 20 by a helical spring 23 creates the damping energy losses.

The construction of the torus shaped fluid damper 12 could be of a variety of shapes and configurations as long as relative movement of the viscous fluid was obtained to achieve the energy losses desired. Further, it should be recognized that even if a maximum rotational extensional ratio is not achieved, the mass 9 will rotate upon the plunging action of the spring to substantially meet the objects of the invention.

A digital and also an analog computer run shows the damper to be extremely effective. For the satellite design previously described the 100 # damper will damp the satellite amplitude in pitch to 1/2.71828 (one time constant) of its initial amplitude in 2½ orbits.

An alternative to the use of viscous damping for removal of energy is the use of a magnetic material in the damping mass which causes magnetic hysteresis losses during every rotation of the damper mass when the damper mass rotates relative to the earth's magnetic field. One of the advantages of the magnetic hysteresis loss type damper would be its structural simplicity. No relative movement or moving parts are required. However, the damping advantages at high altitude where the earth's magnetic field is weak would be limited. Nevertheless, a magnetic damper utilizing the rotational aspects of the helical spring is possible.

In accordance with the patent statutes one best known embodiment of the invention has been illustrated and described in detail, it is to be particularly understood that the invention is not limited thereto or thereby, but that the inventive scope is defined in the appended claims.

What is claimed is:

1. In a damping system for a gravity gradient satellite, the combination of
    a gravity gradient satellite means having a mass moment of intertia of about 750,000 slug-ft.$^2$,
    mass means having a weight of between about 3 pounds and about 150,
    helically wound spring means operatively connected at one end to said satellite means and at the other end to said mass means substantially on the longitudinal axis thereof, said spring means having a length of between about 20 feet and about 300 feet, a wire diameter of between about .005 and about .250 and a coil diameter of between about 6 inches and about 48 inches.
    said mass means having its mass and inertia so related to the oscillation of said satellite means that the extensional frequency of said spring means caused by the oscillations of the satellite produces a maximum cross-coupling of rotation to extension ratio, and
    means operatively carried by said mass means which displaces upon rotation of said mass means to effect friction losses.

2. In a satellite damping system, the combination of
    a satellite,
    a mass means,
    a helically coiled spring having one end operatively connected to the center of gravity of said satellite and the other end operatively connected to the center of gravity of said mass means, said spring adapted to effect rotary motion to said mass means as defined by the period of oscillation of said satellite and the rotational inertia of said mass means to achieve a maximum cross-coupling of rotation to extension ratio of the spring, and
    means operatively carried by said mass means which displaces upon rotation of said mass means to effect friction losses.

3. A satellite damping system according to claim 2 where the mass means includes a lightweight outer shell to which the spring is attached, and where the means operatively carried by the mass means is a solid inner member which has a large mass-moment of inertia compared with the outer shell, and a thin layer of fluid separating the outer shell from the inner member.

4. A satellite damping device according to claim 3 where the properties of the spring and the mass and mass-moment of inertia of the means operatively carried by the said mass means are related to the mass and known orbital frequency of the satellite so that the extensional natural frequency of the spring caused by the oscillations of the satellite achieves a maximum cross-coupling of rotation to extension ratio of the spring.

5. In a satellite damping system, the combination of
    a satellite,
    a mass means,
    a helically coiled spring having one end operatively connected to the satellite and the other end operatively connected to the mass means, said spring adapted to effect rotary motion to said mass means as defined by the period of oscillation of said satellite and the rotational inertia of said mass means to achieve a maximum cross-coupling of rotation to extension ratio of the spring, and
    means operatively carried by said mass means which displaces upon rotation of said mass means to effect friction losses.

References Cited by the Examiner

UNITED STATES PATENTS

| 2,584,222 | 2/1952 | O'Connor | 188—1 |
| 3,114,518 | 12/1963 | Fischell | 244—1 |
| 3,179,399 | 4/1965 | Ellis | 188—1 |

FERGUS S. MIDDLETON, *Primary Examiner.*